(12) United States Patent
Yang

(10) Patent No.: US 9,971,613 B2
(45) Date of Patent: May 15, 2018

(54) TAG BASED PERMISSION SYSTEM AND METHOD FOR VIRTUALIZED ENVIRONMENTS

(71) Applicant: VMware, Inc., Palo Alto, CA (US)

(72) Inventor: Jianping Yang, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 207 days.

(21) Appl. No.: 14/046,063

(22) Filed: Oct. 4, 2013

(65) Prior Publication Data

US 2015/0101042 A1 Apr. 9, 2015

(51) Int. Cl.
| | |
|---|---|
| *G06F 21/12* | (2013.01) |
| *G06F 9/455* | (2018.01) |
| *G06F 21/53* | (2013.01) |
| *H04L 12/18* | (2006.01) |
| *G06F 21/62* | (2013.01) |

(52) U.S. Cl.
CPC ............ *G06F 9/455* (2013.01); *G06F 21/12* (2013.01); *G06F 21/53* (2013.01); *G06F 21/6218* (2013.01); *H04L 12/18* (2013.01)

(58) Field of Classification Search
CPC ...... G06F 21/12; G06F 21/53; G06F 21/6218; H04L 12/18

USPC .......................................................... 726/27
See application file for complete search history.

(56) References Cited

U.S. PATENT DOCUMENTS

| | | | |
|---|---|---|---|
| 7,185,192 B1 * | 2/2007 | Kahn ............................ | 713/155 |
| 8,850,434 B1 * | 9/2014 | Butikofer et al. ................ | 718/1 |
| 2002/0077803 A1 * | 6/2002 | Kudoh ................ | G06F 21/6218 704/1 |
| 2014/0208414 A1 * | 7/2014 | Brandwine ......... | G06F 21/6218 726/17 |

FOREIGN PATENT DOCUMENTS

WO     WO 2014019815 A1 *  2/2014

* cited by examiner

*Primary Examiner* — Dao Q Ho
(74) *Attorney, Agent, or Firm* — Patterson & Sheridan, LLP

(57) ABSTRACT

A virtualized computing system includes a plurality of inventory objects and an access control subsystem that manages permissions to perform actions on the inventory objects using corresponding access control labels of the inventory objects. Permissions are managed by detecting a change in an association of a tag with an inventory object, where the tag defines one or more users and one or more privileges. In response to the detecting, an access control label of the inventory object is updated based on the users and privileges that are defined by the tag.

8 Claims, 7 Drawing Sheets

| ACL 150 | | |
|---|---|---|
| User 301 | Privilege 311 | VM 111 |

TAG BASED PERMISSION SYSTEM AND METHOD FOR VIRTUALIZED ENVIRONMENTS

BACKGROUND

With the advent of cloud-based computing, virtualized datacenters have become more prevalent. By implementing and using virtual machines, which are software emulations of physical computers, virtualized datacenters have significant advantages over traditional, hardware-oriented datacenters, such as improved hardware utilization, efficient energy use, and lower equipment costs. Further, the configuration and deployment of traditional servers is a lengthy process and time-consuming process, while virtual machines may be deployed more easily in response to organizations' computational requirements. In large cloud-based virtualized datacenter environments, end users who require access to various datacenter resources typically require permissions to those resources. For example, a user who needs to access and execute a virtual machine normally needs permission to start the virtual machine, execute the virtual machine on a physical host, and to store virtual machine files to a datastore. Because large virtualized datacenter environments may include hundreds of end users, each of whom require access to a diverse set of system resources, the task of managing access permissions to those resources becomes unwieldy. Indeed, a system administrator who seeks to manage permissions in such an environment is often required to define, update, and delete permissions for each user and for each resource. With thousands of resources to maintain, a more centralized solution is needed.

In the past, permissions to resources in virtualized datacenters were managed by organizing those resources into folders and managing permissions on a folder basis. A folder contains a collection of managed system resources (or inventory objects, as they are often referred to), where the resources contained in the folder are of the same type. Thus, a folder that contains virtual machines may only contain virtual machines, or a folder that contains networking devices may only contain such devices, and so forth. This solution has proven somewhat advantageous because user permissions on a folder are applied to all resources contained therein. However, the folder solution suffers from drawbacks. First, users need access to a diverse range of system resources, which cannot exist in a common folder. Thus, separate permissions must be maintained for each folder group; there is no way to group folders that contain unlike inventory objects together. As different types of objects (e.g. storage devices, networking components, and so on) are developed, the problem of maintaining separate permissions on a per folder basis becomes clearer. Further, permissions maintained on a folder are applied to all objects in a folder on a group basis. That is, permissions and privileges on folder objects are derived from the folder itself, not from the inventory objects individually. This means that, when an inventory object in a folder is moved to a different folder, the permissions and privileges associated with that inventory object are inaccessible and, thus, need to be redefined.

This stands in contrast to the assignment of permissions on individual objects. In such a case, the permissions are unaffected by moving objects around a folder hierarchy. However, this solution, as mentioned above, suffers from being non-scalable with respect to administration.

SUMMARY OF THE DISCLOSURE

One or more embodiments provide a method for managing permissions in a virtualized computing system, where the virtualized computing systems has a plurality of inventory objects and an access control subsystem that manages permissions to perform actions on the inventory objects using corresponding access control labels of the inventory objects. The method includes the step of detecting a change in an association of a tag with an inventory object, where the tag defines one or more users and one or more privileges. The method also includes the step of updating an access control label of the inventory object based on the users and privileges that are defined by the tag in response to the detecting.

A further embodiment provides another method to manage permissions in a virtualized computing system, where the virtualized computing systems has a plurality of inventory objects and an access control subsystem that manages permissions to perform actions on the inventory objects using corresponding access control labels of the inventory objects. The method includes the step of detecting a change in contents of a tag that defines one or more users and one or more privileges. The method also includes the step of, in response to the detecting, updating access control labels of inventory objects that the tag is associated with, based on the users and privileges that are defined by the tag.

A further embodiment provides virtualized computing system that is comprised of a plurality of hosts executing virtualization software configured to support the execution of virtual machines therein, and a tag configured to be associated with one or more of the hosts and virtual machines, wherein the tag defines user privileges to be propagated to the one or more hosts and virtual machines.

DETAILED DESCRIPTION

Figure 1:
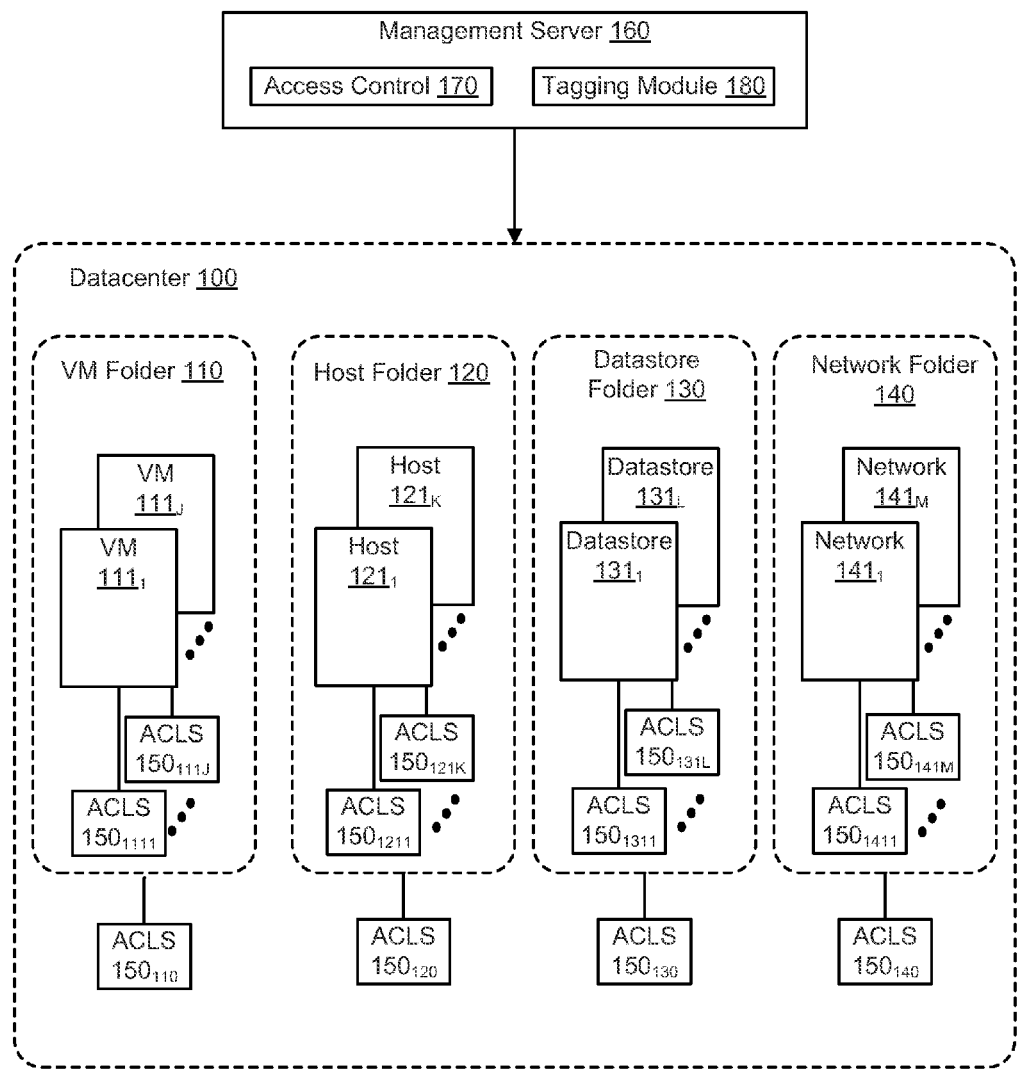
FIG. 1 is a block diagram that depicts a management server, which includes an access control module and a tagging module, and which accesses a datacenter folder with inventory objects contained therein, according to embodiments.

FIG. 1 depicts a block diagram of a management server 160 that accesses a datacenter folder 100, according to one or embodiments. Management server 160 is a computer host in which executes software that coordinates the execution of processes in a virtualized computing environment. An example of such software is the vSphere® product, which is commercially available from VMware, Inc. of Palo Alto, Calif. Embodiments of management server 160 typically run on a server-class computer (i.e., a computer that has sufficient capacity and connectivity to coordinate and control the activities of various tasks executing in a virtualized computing environment). Among the components included with management server 160 are access control module 170 and tagging module 180. Access control module 170 is computer software that determines the accessibility of "inventory objects" in a virtualized computing environment to one or more end users of the virtualized computing environment. Typically, access control module 170 receives requests to grant access to end users to perform certain tasks on the inventory objects. End user requests are typically sent by application programs that end users execute, such as a word processor or spreadsheet. In embodiments, such application programs will attempt to read or write to a file, thereby generating an access request that is handled by access control module 170. Access control module 170 then determines the permission that an end user has with respect to the particular file being read or written, and then, based on the permission, either grants or denies access to the particular file. Embodiments of access control module 170 make this determination through permission control data objects referred to as Access Control Labels (or "ACLs"), which are depicted in FIG. 1 as ACLs $150_n$, where n represents an integer value that indicates a particular instance of an ACL. ACLs 150 are described below in the context of inventory objects organized in datacenter folder 100.

Still referring to FIG. 1, management server 160 also includes tagging module 180, which is computer software that creates "tag objects" (referred to herein as "tags"), deletes tags, and updates tags. As described more fully later in this specification, tags define a grouping of users and permissions (or "privileges") and, after the tags are "attached" (i.e., associated) to inventory objects, the user privileges defined on the tag are propagated to the object to which the tag is attached. Tagging module 170 handles the propagation of privileges to tagged objects, as well as the removal of privileges when a tag is removed from a previously tagged object.

FIG. 1 also depicts datacenter folder 100, which management server 160 has access to. A virtualized computing environment is typically comprised of multiple hosts that are networked together over one or more networks or subnetworks. Within the hosts, virtual machines execute, where the virtual machine is a software emulation of a real, physical computer. In order to perform useful work, each virtual machine executes on one or more computer hosts, has access to one or more datastores (in which files are created and written to in a persistent manner), and communicates over one or networks or subnetworks. In embodiments, datacenter folder 100 is a container object that serves as a container for, among other objects, hosts, virtual machines, datastores, and networks. In one embodiment, each host and virtual machine that executes in a virtualized computing environment is contained in a distinct datacenter. Unlike a folder (described below), which organizes and contains a specific type of object, a datacenter is an aggregation of all the different types of objects needed to execute in a virtual infrastructure. In typical embodiments, datacenter folder 100 contains virtual machines (and templates of virtual machines), hosts (and clusters of hosts), networks, and datastores. Datacenter folder 100 may also be considered as a namespace for the virtual machines, hosts, networks, and datastores stored therein. In other words, each of these objects has a unique name within a datacenter folder 100.

As shown in FIG. 1, datacenter folder 100 contains virtual machine (VM) folder 110, host folder 120, datastore folder 130, and network folder 140. As mentioned earlier, each of the aforementioned folders contains an object of a specific type. In embodiments, the objects contained in the folders are the key components that enable the functioning of a virtualized computing system. As shown, VM folder 110 contains VMs $111_1$-$111_J$, host folder 120 contains hosts $121_1$-$121_K$, datastore folder 120 contains datastore $131_1$-$131_I$, and network folder 140 contains network $141_1$-$141_M$. As discussed earlier, each VM 111 is a software implementation of a computer that executes programs much like a physical machine. In embodiments, VM 111 provides a system platform that supports the execution of a guest operating system (OS) and emulates a particular computer architecture. Typically, VMs 111 are used in cases where efficient use of computing resources is desired, where multiple virtual machines share a single physical hardware platform.

Each host 121 contained in host folder 120 is typically a server class computer that supports the execution of a virtual machine therein. In embodiments, hosts 121 execute virtualization software that includes a hypervisor, which enables the concurrent execution of multiple VMs. An example of virtualization software that supports the execution of multiple VMs is the vSphere® product, commercially available from VMware, Inc. of Palo Alto, Calif. In addition, each of the hosts runs on a particular hardware platform that implements a system architecture, such as, for example, the ×86 architecture.

The datastores 131 contained in datastore folder 130 are, in embodiments, storage devices that store, for example, the files required to execute the applications that run within the VMs 111. In embodiments, each datastore 131 may be a single disk unit, a storage array, a RAID array, or several storage units connected in a storage area network. Networks 141 contained in network folder 140 each represents a network accessible by either hosts or virtual machines. Each network 141 may be either a physical network or a logical network, such as a virtual local area network (or vLAN).

Also shown in FIG. 1 are ACLs 150. As shown, ACLs 150 are associated with inventory objects, where the inventory objects depicted in FIG. 1 are VMs 111, hosts 120, datastores 130, and networks 140. Further, VM folder 110, host folder 120, datastore folder 130, and network folder 140 may also be considered inventory objects. As shown conceptually in FIG. 1, ACLs $150_{1111}$-$150_{111J}$ are associated with VMs $111_1$-$111_J$, respectively. As was mentioned earlier, and as will be described in further detail below, an ACL is used by access control module 170 to determine if an end user has sufficient privileges to perform an operation on one of the inventory objects. For example, with respect to a given VM 111, embodiments of the invention implement a "power-on" privilege, which enables an end user who has such a privilege, the ability to start the VM 111. Another example is a "power-off", which enables an end user having such privilege the ability to stop the VM 111. Each of these user-privilege combinations is implemented in an ACL 150, where one or more ACLs 150 are associated with a given inventory object.

Thus, as shown in FIG. 1, ACLs $150_{1211}$-$150_{121K}$ are associated with hosts $121_1$-$121_K$. Typical privileges defined in ACLs 150 associated with a host 121 include permission to allocate processor and memory resources. Further, ACLs $150_{1311}$-$150_{131I}$ are associated with datastores $131_1$-$131_I$. Examples of privileges that pertain to a datastore include permission to allocate persistent storage space. Finally, ACLs $150_{141_1}$-$150_{141_M}$ are associated with networks $141_1$-$141_M$. Privileges that pertain to networks 141 include permission to allocate network bandwidth.

Additionally, FIG. 1 depicts ACLs $150_{110}$, $150_{120}$, $150_{130}$, and $150_{140}$, which are ACLs associated, respectively, with VM folder 110, host folder 120, datastore folder 130, and network folder 140. In some embodiments, when one or more ACLs 150 is associated with a folder that contains inventory objects, the user privilege defined in each ACL 150 is associated with all inventory objects contained in the associated folder. For example, with reference to FIG. 1, if one of ACLs $150_{110}$ defines a user privilege of "power-on" for a particular end user, then that particular end user will have a "power-on" privilege for all VMs contained in VM folder 110. Thus, the particular end user will have privilege to power on each of VMs $111_1$-$111_J$ and, if the end user attempts to do so, access control module 170 permits it.

Figure 2:
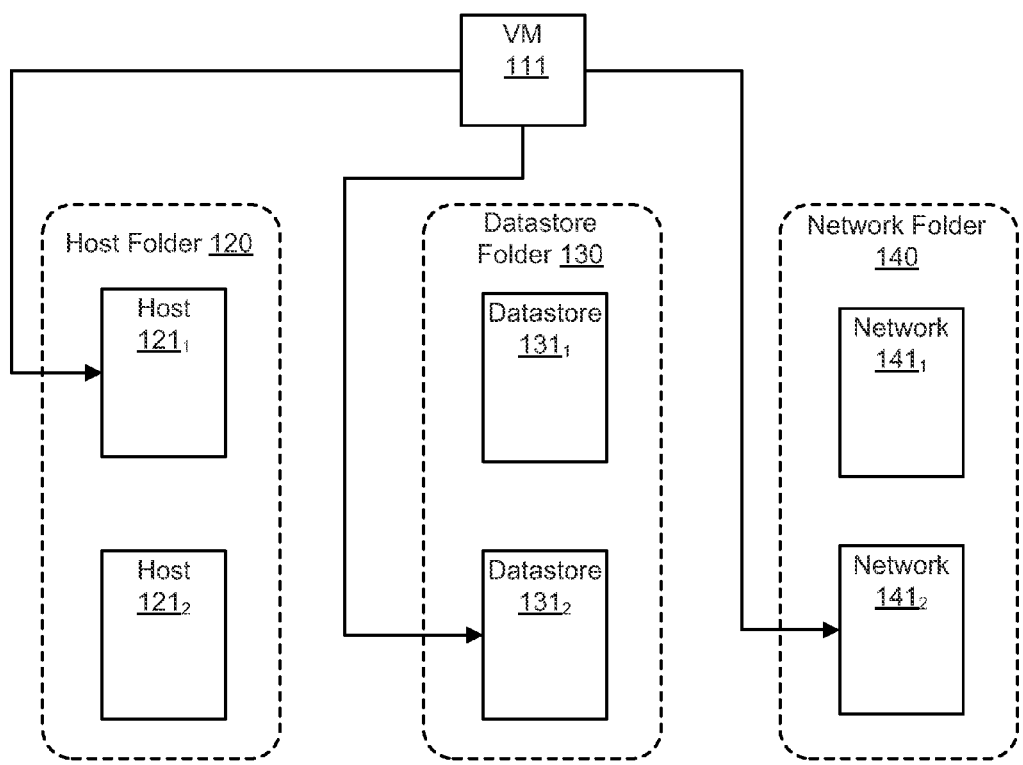
FIG. 2 is a block diagram that depicts a relationship between a virtual machine and inventory objects that the virtual machine accesses during execution, according to embodiments.

FIG. 2 depicts how a VM 111 is associated with the other inventory objects depicted in FIG. 1. In FIG. 2, a VM 111 is created. In order to execute, a VM 111 requires resources from datacenter folder 100, namely, a host on which to run, a datastore, and a network connection. In the example depicted in FIG. 2, host folder 120 contains hosts $121_1$ and $121_2$, datastore folder contains datastores $131_1$ and $131_2$, and network folder 140 contains networks $141_1$ and $141_2$. After creation, VM 111 is associated with host $121_1$ located in host folder 120, which means that VM 111 will execute on physical host $121_1$. This means that the applications and guest operating system executing in VM 111 utilizes the CPU and memory resources of host $121_1$. In addition, as shown in FIG. 2, VM 111 is associated with datastore $131_2$, and with network $141_2$.

Referring to the components illustrated in FIG. 2, in order to run VM 111, an end user would need several privileges, for example: power-on privilege for VM 111, the privilege to run VM 111 on host $121_1$, the privilege to allocate space on datastore $131_2$, and allocate bandwidth over network $141_2$. Each of the aforementioned privileges is specified by an access control label.

Figures 3, 4:
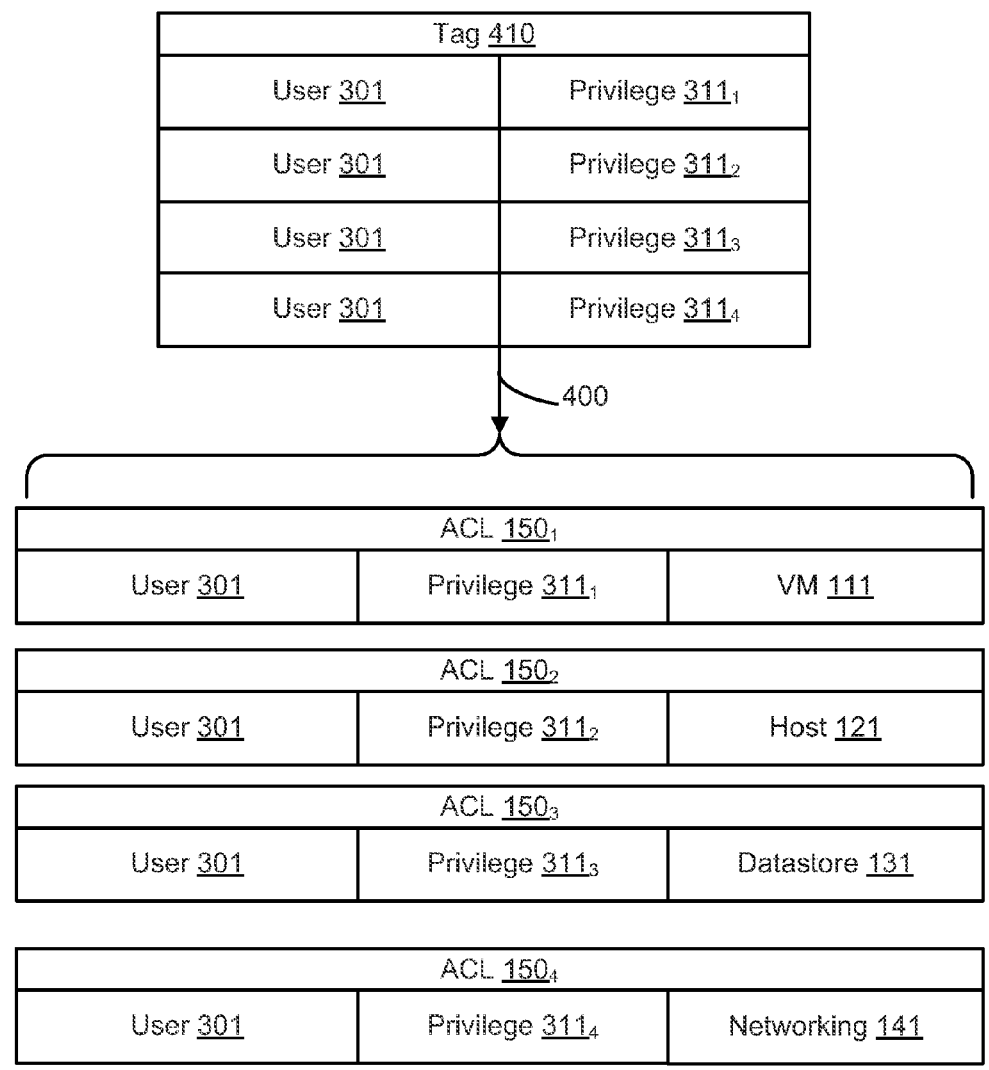
FIG. 3 is a block diagram that illustrates a permission embodied as an access control label.
FIG. 4 is a block diagram that depicts a tag and the generation of access control labels from the tag, according to embodiments.

FIG. 3 depicts a conceptual diagram of an ACL 150, according to embodiments. Conceptually, an ACL 150 may be considered a triple, namely a user 301, an inventory object, and a privilege 311. In FIG. 3, the inventory object is a VM 111. With respect to ACL 150 depicted in FIG. 3, user 301 is an end user that wishes to perform some operation on VM 111. As mentioned earlier, a common operation performed on VMs is the power-on function, which starts the virtual machine. Thus, in order for user 301 to power on VM 111, access control module 170 requires user 301 to have the appropriate power-on privilege for VM 111. Thus, the ACL 150 that is defined in order to allow user 301 to power-on VM 111 comprises the fields: user 301, VM 111, and privilege 311, where privilege 311 is the power-on privilege. Thus, when user 301 attempts to power on VM 111, access control module 170 determines whether an ACL 150 exists such as to allow the power-on operation to go forward. If access control module 170 determines that an ACL 150 that defines the appropriate combination of user 301, VM 111, and privilege 311 exists, then the power-on operation is allowed to go forward. If, however, there is no such ACL 150, then access control module 170 prevents user 301 from powering on VM 111.

FIG. 4 depicts, according to one embodiment, a tag 410. As mentioned earlier, tags are created by tagging module 180. As shown in FIG. 4, a tag is an association of users 301 and privileges 311. In FIG. 4, tag 410 is shown with four "entries" (or associations). Each entry shown pertains to a same user 301. However, in embodiments, this need not be the case. Indeed, a tag 410 supports a plurality of entries, where each entry may pertain to a different user 301. Tag 410 also contains a plurality of privileges 311. As shown in FIG. 4, tag 410 has privileges $311_1$, $311_2$, $311_3$, and $311_4$. Thus, conceptually, tag 410 associates user 301 with the four privileges $311_1$-$311_4$.

However, creating a tag and adding users 301 and privileges 311 to it are not sufficient to create a permission to access an inventory object. In order to create permissions in the system that access control module 170 may use, tag 410 must be associated with one or more objects. This association of a tag to an object is referred to as "tagging" the object and this association may be specified by a user through a graphical user interface in one embodiment. When an object is tagged, permissions defined on the tag are "propagated" to the object that is being tagged. This propagation is manifested, in embodiments, through the creation of one or more ACLs 150. In the example depicted in FIG. 4, tagging operation 400 is carried out by the user on four distinct inventory objects. First, tag 410 is associated with VM 111 (or, in other words, VM 111 is tagged with tag 410). In this case, the appropriate privileges contained in tag 410 are propagated to VM 111. Thus, in the example shown, ACL $150_1$ is created. ACL $150_1$ pertains to the user privilege combination of user 301 and privilege $311_1$. Thus, ACL $150_1$ comprises the association of user 301, privilege $311_1$, and VM 111. In embodiments, only those privileges defined in tag 410 that pertain to a virtual machine are propagated to VM 111. Thus, in the example depicted in FIG. 4, only privilege $311_1$ is propagated to VM 111 because privilege $311_1$ is a virtual machine privilege (such as power-on or power-off). In other cases, if other privileges defined in tag 410 pertain to virtual machines, then ACLs 150 for those other privileges would be created.

Continuing with the example shown in FIG. 4, ACL $150_2$ is also created because, in addition to tagging VM 111 with tag 410, host 121 is also tagged with tag 410. Hence, ACL $150_2$ is created, and which defines the association of user 301, privilege $311_2$, and host 121. As is the case for VM 111, only one ACL 150 (namely, ACL $150_2$) is created because only one privilege 311 in tag 410 pertains to a host. For example, privilege $311_2$ may be an execute virtual machine privilege, which would bestow permission on user 301 to execute virtual machines on host 121.

As shown in FIG. 4, tagging operation 400 on datastore 131 with tag 410, results in the creation of ACL $150_3$. ACL $150_3$ thus describes an association of user 301, privilege $311_3$, and datastore 131. Privilege $311_3$ is a privilege that pertains to operations to be performed on datastores, as opposed to operations performed on, for example, virtual machines or hosts. In addition, because privilege $311_3$ is the only privilege defined in tag 410 that pertains to a datastore, only ACL $150_3$ in connection with datastore 131.

Finally, ACL $150_4$ is created as a result of tagging operation 400. As shown in FIG. 4, ACL $150_4$ is created as a result of network 141 being tagged with tag 410. ACL $150_4$ comprises user 301, privilege $311_4$, and network 141. Privilege $311_4$ is a privilege associated with a network.

In some embodiments, ACLs 150 that are created as a result of a tagging operation also include a propagation indicator. Such an indicator may be in the form of a flag, such as a Yes/No flag, which indicates whether an ACL 150 was created as a result of propagation of user privileges from a tag (as distinguished from an ACL that is created directly on the inventory object). Other embodiments are envisioned. The reason for such an indicator is to inform access control module 170 to disallow the deletion of ACLs 150 created from tagging operations unless the deletion is performed using tagging module 180. As mentioned earlier, tagging module 180 creates, updates, and deletes tags. The deletion of a tag, as will be further described herein, results in the deletion of all ACLs 150 created as a result of tagging any object with the tag prior to its deletion.

Figure 5:
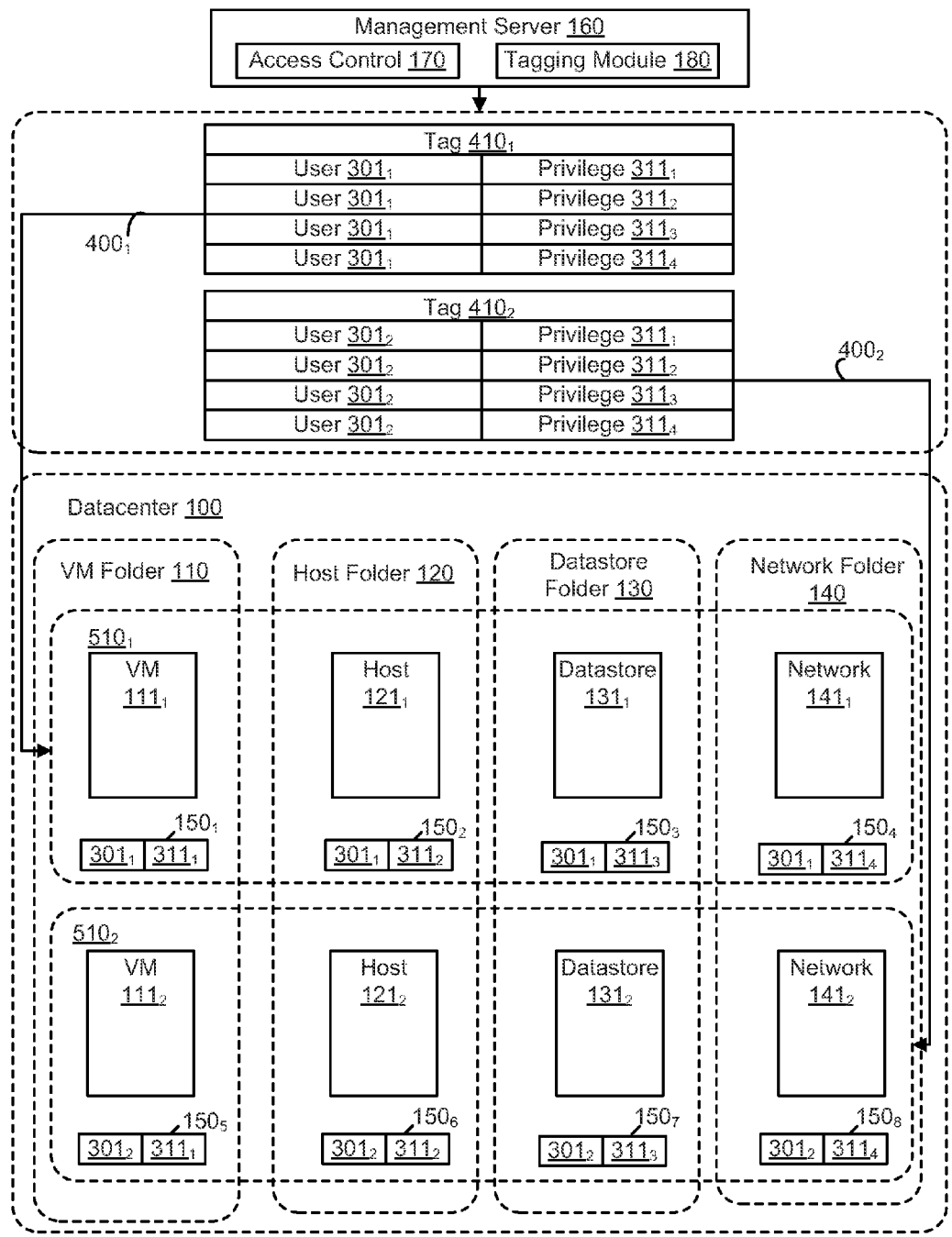
FIG. 5 is a block diagram that illustrates a process of tagging inventory objects contained in a datacenter and generating access control labels as a result of the tagging.

FIG. 5 is a block diagram that depicts the tagging of inventory objects contained in datacenter folder 100, according to embodiments. Management server 160, which contains tagging module 180, controls the overall tagging operation. In FIG. 5, datacenter folder contains four inventory object folders, namely, VM folder 110, host folder 120, datastore folder 130, and network folder 140. Further, in the example depicted, VM folder 110 contains two VMs $111_1$ and $111_2$, host folder 120 contains two hosts $121_1$ and $121_2$, datastore folder 130 contains two datastores $131_1$ and $131_2$, and network folder 140 contains two networks $141_1$ and $141_2$. As shown, tag $410_1$ includes four entries, each of which associates one of privileges $311_1$-$311_4$ with user 301. Similarly, tag $410_2$ contains four entries, each of which associates one of the same privileges $311_1$-$311_4$ with another user, namely user $301_2$.

Still referring to FIG. 5, tag 410, through tagging operation $400_1$, is tagged to VM $111_1$, host $121_1$, datastore $131_1$, and network $141_1$. This results, as shown, in the creation of ACLs $150_1$-$150_4$, which are, respectively, associated with VM $111_1$, host $121_1$, datastore $131_1$, and network $141_1$. Note that this illustration of ACLs 150 in FIG. 5 associates a user 301 and a privilege 311 in a single structure, combined with a separate association with an inventory object. This illustration is merely another embodiment of ACLs 150 and is equivalent conceptually with the ACLs depicted in FIGS. 4 and 5.

As mentioned previously, the creation of ACLs 150 provides indication to access control module 170 to permit end user $301_1$ to access each of the aforementioned inventory objects according to the permissions included in tag $501_1$. As an example, if privilege $311_1$ (a virtual machine privilege) is a "power-on" privilege, then user $301_1$ has permission to power on VM $111_1$, and access control module 170 will allow user $301_1$ to perform such an operation. As another example, permission $311_2$ may be "reboot host." In such a case, access control module 170 will permit user $301_1$ to reboot host $121_1$.

Similarly, tagging operation $400_2$ tags VM $111_2$, host $121_2$, datastore $131_2$, and network $141_2$ with tag $410_2$. This results in the creation of ACLs $150_5$-$150_8$ associated with each of the aforementioned inventory objects, respectively. Note that the privileges $311_1$-$3111_4$ in tag $410_2$ are the same as those defined in tag $410_2$. This means that, if privilege $311_1$ is a "power-on" privilege, then, as a result of the two tagging operations $400_1$ and $400_2$, user $301_1$ has permission to power on VM $111_1$, but not VM $111_2$, while user $301_2$ has permission to power on VM $111_2$, but not VM $111_1$.

In addition, note that the tagging of VM $111_1$, host $121_1$, datastore $130_1$, and network $141_1$ by way of tagging operation $400_1$ results in the creation of a "dynamic group," denoted as $510_1$. Similarly, the tagging of VM $111_2$, host $121_2$, datastore $130_2$, and network $141_2$ by way of tagging operation $400_2$ results in the creation of another dynamic group, denoted as $510_2$. Group $510_1$, which is comprised of the objects tagged by tag $410_1$, contains objects of different types. As can be seen, unlike conventional folders, permissions can be assigned to a dynamic group of unlike objects in an efficient manner using group $510_1$. Without tagging, a system administrator would need to separately assign permission to a user 301 to each of the inventory objects required, namely a VM 111, host 121, datastore 131, and network 141. Alternatively, a system administrator could assign permission to a user 301 to each of the folders, namely VM folder 110, host folder 120, datastore folder 130, and network folder 140. Thus, permissions would need to be assigned in four different places. However, with tagging, a user 301 is granted permission to tag $410_1$ itself. If tag $410_1$ is tagged to the aforementioned inventory objects, then, after granting permission to the user (or adding the user) to the tag, embodiments of the current invention would propagate the privileges 311 defined in the tag to the inventory objects (through the creation of ACLs 150). The adding of users and permissions to existing tags (as well as their deletion) is described below in the context of updating tags.

Figure 6:
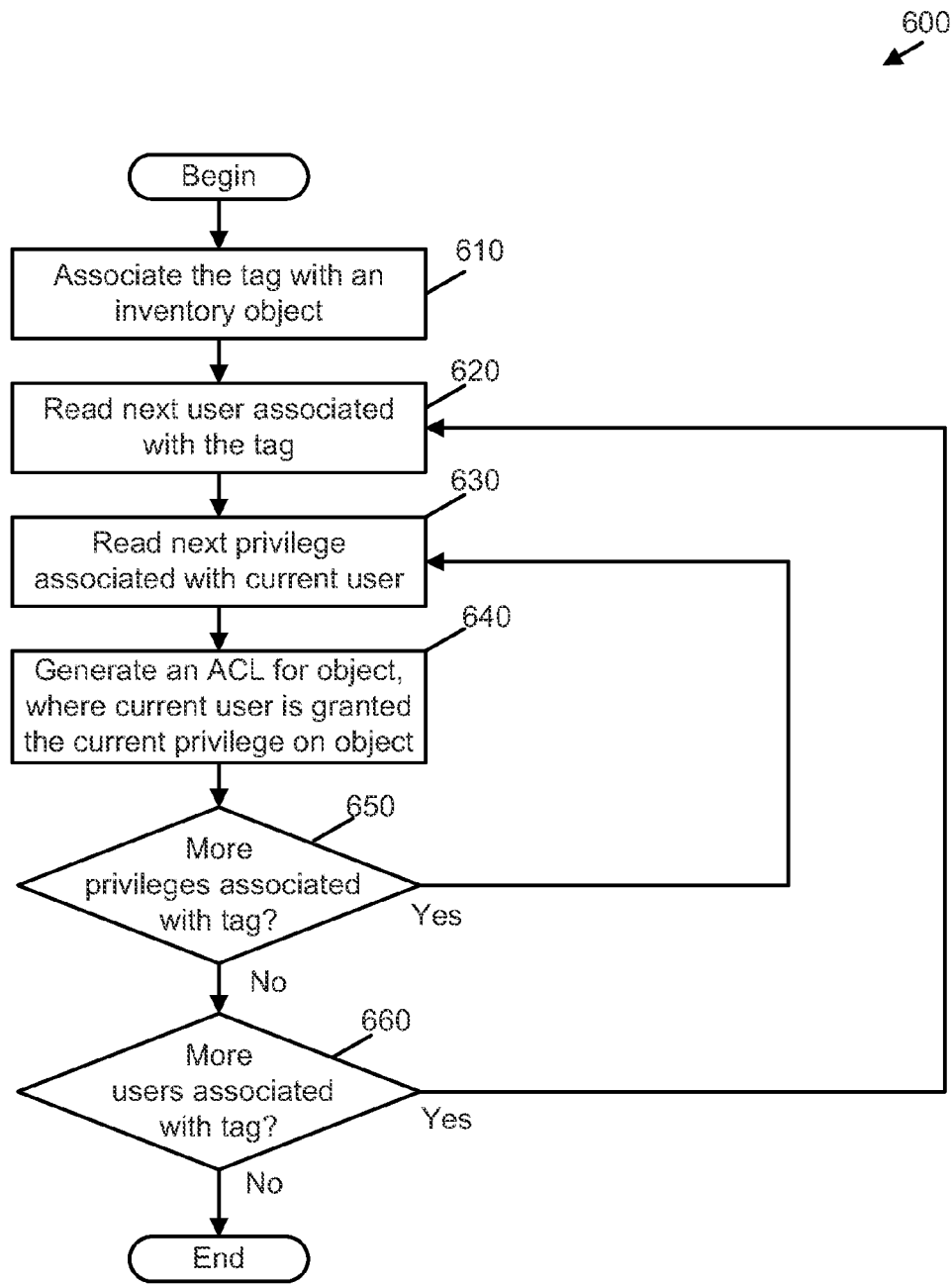
FIG. 6 is a flow diagram that illustrates the generation of permissions as a result of tagging an inventory object.

FIG. 6 is a flow diagram 600 that depicts a method by which a tagging module 180 carries out the propagation of permissions to an inventory object when the inventory object is tagged, according to embodiments. As previously described, in one or more embodiments, inventory objects comprise virtual machines, hosts, datastores, and networks. Referring to FIG. 6, at step 610, tagging module 180 associates a tag with an inventory object in response to, e.g., an administrator specifying through a user interface the association of the tag with the inventory object. As previously mentioned, a tag is comprised of one or more users and one or more privileges, wherein each user is associated with all of the privileges defined in the tag. For each user, step 620 through step 660 are executed to create one or more ACLs that grant the user certain permissions to the inventory object that is tagged. At step 620, tagging module 180 reads a next user associated with (or "defined in") the tag. At step 630, tagging module 180 reads a next privilege defined in the tag. At step 640, tagging module 180 generates the ACL that grants the user a permission associated with the privilege. For example, the inventory object may be a virtual machine and the privilege may be a power-on privilege. In this example, the permission granted to the user would be the ability to power on the virtual machine. The method then proceeds to step 650, where tagging module 180 determines whether more privileges are defined in the tag. If more privileges are defined in the tag, then the method proceeds to step 630, where tagging module 180 reads a next privilege defined in the tag. If no more privileges are defined in the tag, then the method proceeds to step 660, where the method determines whether there are any more users associated with the tag. As indicated above, steps 620 through 660 are repeated if there are more users associated with the tag. If there are no more users, the method terminates.

Figure 7:
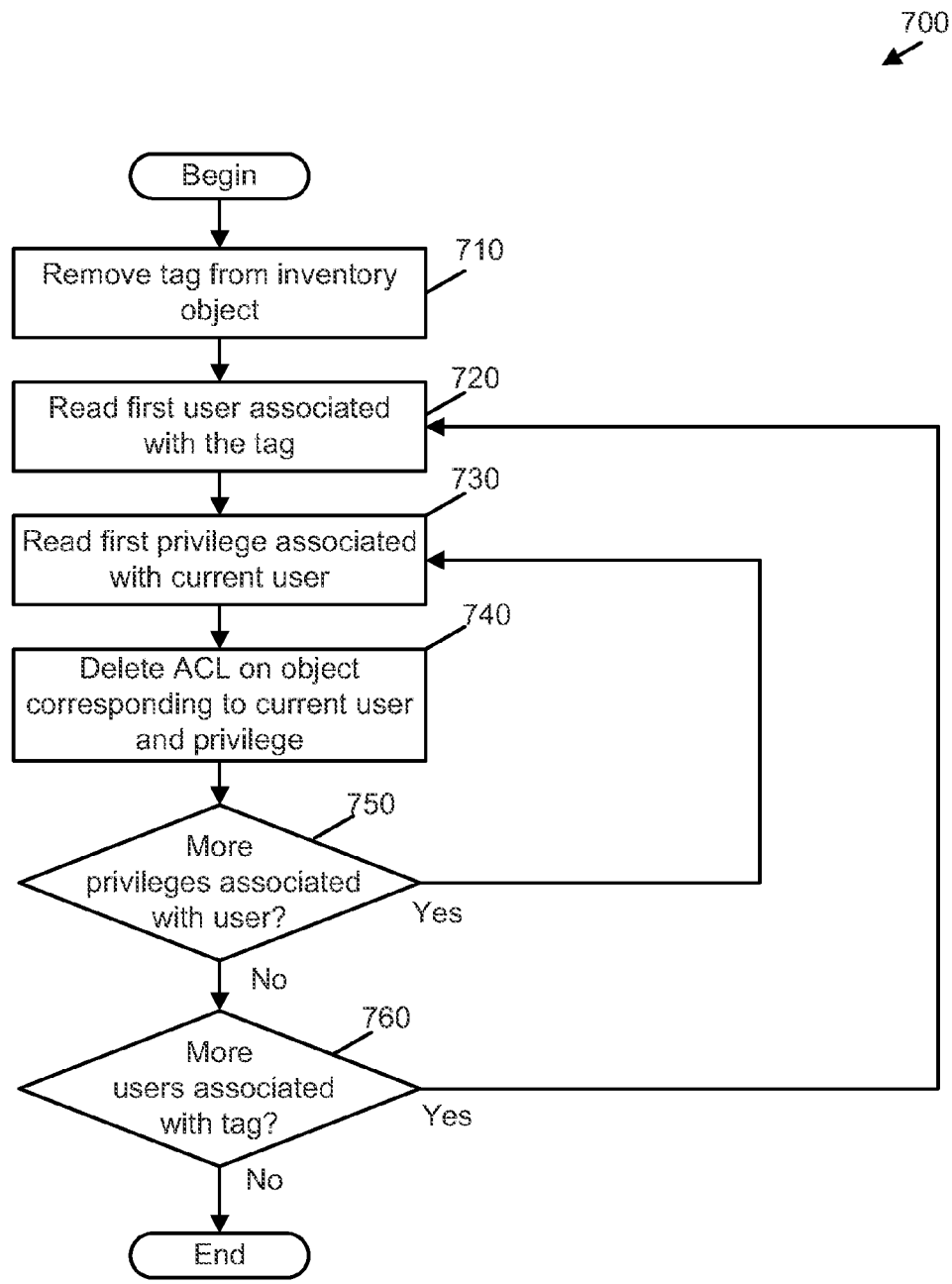
FIG. 7 is a flow diagram that illustrates the deletion of permissions as a result of removing a tag from an inventory object.

FIG. 7 is a flow diagram 700 that depicts a method performed by tagging module 180 for removing permissions on an inventory object when a tag is removed from the inventory object, according to embodiments. Again, as noted for FIG. 6, inventory objects comprise virtual machines, hosts, datastores, and networks. Referring to FIG. 7, at step 710 tagging module 180 removes from an inventory object a tag that is associated with the inventory object in response to, for example, a system administrator specifying through a user interface that the tag is to be removed (or disassociated) from the inventory object. As noted in the description of FIG. 6, a tag is comprised of one or more users and one or more privileges, wherein each user is associated with all of the privileges defined in the tag. For each user, steps 720 through 760 are executed to delete one or more ACLs that, prior to deletion, grant the user certain permissions to the inventory object that is tagged. At step 720, tagging module 180 reads a first user defined in the tag. At step 730, tagging module 180 reads a next privilege defined in the tag. At step 740, tagging module 180 deletes an ACL associated with the object that the tag is being removed from, where the deleted ACL previously granted a permission associated with the privilege to the user with respect to the inventory object from which the tag is being removed. For example, the inventory object may be a datastore and the privilege may be a file allocation privilege. In this example, the deletion of the ACL would remove the permission for the user to allocate files on the datastore. The method then proceeds to step 750, where tagging module 180 determines whether more privileges are defined in the removed tag. If more privileges are defined in the removed tag, then the method proceeds to step 730, where tagging module 180 reads a next privilege defined in the removed tag. If no more privileges are defined in the removed tag, then the method proceeds to step 760, where the method determines whether there are any more users associated with the removed tag. As indicated above, steps 720 through 760 are repeated if there are more users associated with the removed tag. If there are no more users, the method terminates.

Figure 8:
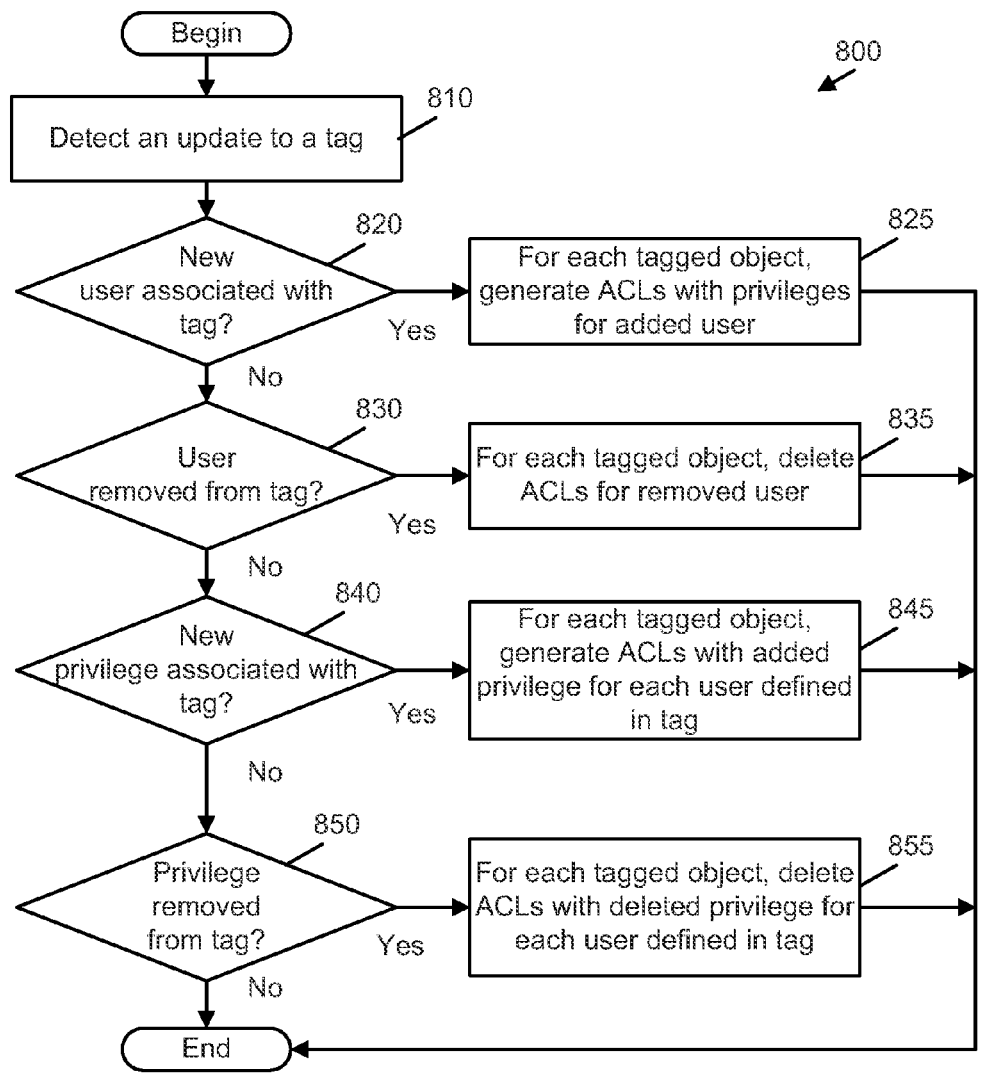
FIG. 8 is a flow diagram the updating of a tag that is associated with an inventory object, and the updating of permissions as a result of the tag update.

FIG. 8 is a flow diagram which depicts a method 800 performed by tagging module 180 to detect changes to a tag and to take appropriate steps in response to the detection, according to embodiments. Method 800 may be invoked, for example, by a system administrator specifying through a user interface that certain updates are to be made to a tag. After the method begins, at step 810, tagging module 180 detects an update to a tag. As previously mentioned, tags are comprised of users who have been associated with a tag (or defined in the tag), and privileges to perform certain actions on inventory objects. A tag may undergo different types of updates, where each type of update may pertain to a change to the users or privileges associated with the tag. Steps 820 through 855 are executed by tagging module 180 in response to different types of updates undergone by the tag. In the method depicted in FIG. 8, at step 820, tagging module 180 determines whether a new user is associated with a tag. In some embodiments, a new user is associated with a tag when that user, for example, is granted permission to the tag. In other embodiments, a user may be added to the tag by some other mechanism, such as the updating of a database or file. If, at step 820, tagging module 180 determines that a new user is associated with the tag, then, at step 825, method 800 generates ACLs for the new user. In embodiments, method 800 cycles through all objects associated with the tag to which the new user has been associated. For each such tagged object, method 800 generates an ACL for each privilege defined in the tag that pertains to the type of object for which the privilege is relevant. For example, if a virtual machine and a datastore are associated with the updated tag, then method 800 generates ACLs with virtual machine privileges (e.g., power-on or power-off) for the tagged virtual machine, while method 800 generates ACLs with datastore privileges (e.g., allocate file and write file) for the tagged datastore. After step 825, method 800 terminates.

Continuing with FIG. 8, if method 800 determines at step 820 that a new user has not been associated with the tag, then method 800 proceeds to step 830. At step 830, tagging module 180 determines whether a user is removed from the updated tag. If a user is removed from the updated tag, then method 800 proceeds to step 835. At step 835, method 800 deletes, for each object associated with the updated tag, all ACLs associated with the removed user, thereby removing all privileges defined in the tag from the removed user with respect to the object. After step 835, method 800 terminates.

At step 840, method 800 determines whether a new privilege is associated with the updated tag. If tagging module 180 determines that the update pertains to an added privilege, then method 800 proceeds to step 845. At step 845, method 800 generates ACLs for each appropriate object associated with the updated tag. An appropriate object is an object that is associated with the updated tag, and for which the added privilege is relevant. For example, if the newly added privilege is the power-off privilege for virtual machines, then tagging module 180 generates ACLs only for virtual machine objects that are associated with the updated tag. Once the appropriate objects are determined, tagging module 180 generates ACLs for each appropriate object, where each generated ACL grants a new permission associated with the newly added privilege for all users associated with the tag. Thus, if User1 and User2 are associated with the updated tag, then one ACL is generated for each of User1 and User2 with the new permission for each appropriate object.

Referring again to FIG. 8, if method 800 determines at step 840 that a new privilege was not associated with the tag, then method 800 proceeds to step 850. At step 850, tagging module 180 determines whether a privilege is removed from the tag. If a privilege is removed, then method 800 proceeds to step 855. At step 855, method 800 deletes, for each object associated with the updated tag, each ACL that includes the removed privilege. For example, if a system administrator seeks to remove power-off privilege for all virtual machines associated with a tag, the administrator may remove the power-off privilege from the tag. In such case, method 800 deletes all ACLs from each of the tagged virtual machines that include the power-off privilege, thereby removing this privilege for the tagged virtual machines from all users granted permission on the tag. After step 855, method 800 terminates.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. In a virtualized computing system having a plurality of inventory objects and an access control subsystem that manages permissions to perform actions on the inventory objects, a method of managing the permissions comprising:
   generating a plurality of tags, wherein each tag of the plurality of tags defines an association between one or more users and one or more privileges, and is free from an association with the plurality of inventory objects, wherein a first tag of the plurality of tags comprises first associations between a one or more users and a one or more privileges;
   generating one or more access control labels in response to detecting that the one or more inventory objects are tagged with the first tag, wherein:
      a first access control label of the one or more access control labels specifies a first user, a first privilege of the first tag, and a first tagged inventory object;
      a second access control label of the one or more access control labels specifies the first user, a second privilege of the first tag, and a second tagged inventory object; and
   wherein the first privilege and the second privilege are different;
   wherein the inventory object is one of a virtual machine, a host, a datastore, and a network;
   wherein the tag is associated with the inventory object and with at least one other inventory object that is of a different type; and
   permitting or denying operations to be performed on the inventory object based on the generated access control labels.

2. The method of claim 1, wherein a separate access control label is generated for each combination of the users and privileges that are defined by the tag.

3. In a virtualized computing system having a plurality of inventory objects and an access control subsystem that manages permissions to perform actions on the inventory objects, a method of managing the permissions comprising:
   generating a plurality of tags, wherein each tag of the plurality of tags defines an association between one or more users and one or more privileges, and is free from an association with the plurality of inventory objects, wherein a first tag of the plurality of tags comprises first associations between a one or more users and a first one or more privileges;
   detecting a change in contents of the first tag, wherein the change in the contents corresponds to an association between the one or more users and a second one or more privileges, wherein the second one or more privileges differs from the first one or more privileges;
   in response to said detecting, generating one or more access control labels for the second associations, each of the one or more access control label specifying a different association between a respective one of the first one or more users and a respective one of the second one or more privileges of the first tag and the inventory object;
   wherein the inventory object is one of a virtual machine, a host, a datastore, and a network;
   wherein the tag is associated with the inventory object and with at least one other inventory object that is of a different type; and
   permitting or denying operations to be performed on the inventory object based on the generated access control labels.

4. The method of claim 3, wherein the change in contents occurs as a result of a change in the users defined by the tag.

5. The method of claim 3, wherein the change in contents occurs as a result of a change in the privileges defined by the tag.

6. The method of claim 3, wherein a separate access control label is generated for each combination of the users and privileges that are defined by the tag.

7. A virtualized computing system comprising:
   a host computer executing virtualization software configured to support the execution of virtual machines therein; and
   a management server computer running therein an access control system configured to manage permissions to the host and the virtual machines, the management server configured to:
      generate a plurality of tags, wherein each tag of the plurality of tags defines an association between one or more users and one or more privileges, and is free from an association with the plurality of inventory objects, wherein a first tag of the plurality of tags comprises first associations between a one or more users and a one or more privileges;

tag an inventory object with the tag;

generate one or more access control labels in response to detecting that the one or more inventory objects is tagged with the first tag, wherein:
- a first access control label of the one or more access control labels specifies a first user, a first privilege of the first tag and a first tagged inventory object;
- a second access control label of the one or more access control labels specifies the first user, a second privilege of the first tag and a second tagged inventory object; and
- wherein the first privilege and the second privilege are different;
- wherein the inventory object is one of a virtual machine, a host, a datastore, and a network;
- wherein the tag is associated with the inventory object and with at least one other inventory object that is of a different type; and permit or deny operations to be performed on the inventory object based on the generated access control labels.

8. The virtualized computing system of claim 7, wherein a separate access control label is generated for each combination of the users and privileges that are defined by the tag.

* * * * *